TRIANGULAR VOLTAGE WAVEFORM GENERATOR

Filed May 7, 1964 2 Sheets-Sheet 1

3,322,969
TRIANGULAR VOLTAGE WAVEFORM GENERATOR

Raymond G. Callahan, Manchester, Mass., assignor to High Voltage Engineering Corporation, Burlington, Mass., a corporation of Massachusetts Filed May 7, 1964, Ser. No. 365,739
4 Claims. (Cl. 307—88.5)

This invention relates to the generation of triangular voltage waveforms and in particular to very linear triangular voltage waveforms having substantially equal rise and decay times. That is, there is comprehended herein a novel triangular voltage waveform generator adapted to provide a waveform in which the voltage is linearly dependent upon time during the restoration period as well as during the rise period.

The triangular voltage waveform is commonly used as a time base in electronic control and computer circuits. Such applications require waveforms having very linear rise time characteristics, and various techniques have been developed to provide this linearity. Since the restoration period in triangular waveform generation for most prior art applications has been unimportant, there have heretofore been but few attempts to make such restoration periods linearly dependent upon time. There are, however, certain applications in which symmetrical triangular waveforms are desired. For instance, electronic apparatus adapted to effect scanning with a high energy electron or ion beam must be activated by triangular voltage waveforms having rise and decay time characteristics of substantially equal duration and linearity. The present invention is directed toward achieving, in a triangular waveform, decay time linearity that is comparable to prior art rise time linearity.

Accordingly it is a principal object of this invention to provide a new and improved triangular voltage waveform generator.

It is another object of this invention to provide apparatus adapted to generate a triangular voltage waveform having uniform, substantially linear rise and decay time characteristics.

These, together with other objects and features of the invention will become more readily apparent from the following detailed description taken in conjunction with the accompanying drawings in which like elements are given like reference numerals throughout and wherein.

Basically, a triangular voltage waveform can be generated by successively charging and discharging a condenser through a resistor from a constant voltage source. However, such an arrangement produces exponential sweeps that are substantially linear over only a portion of the cycle. The present invention provides a combination of electronic components which are uniquely arranged to maintain sweep linearity throughout both the charge and discharge periods of such a condenser.

Figure 1:
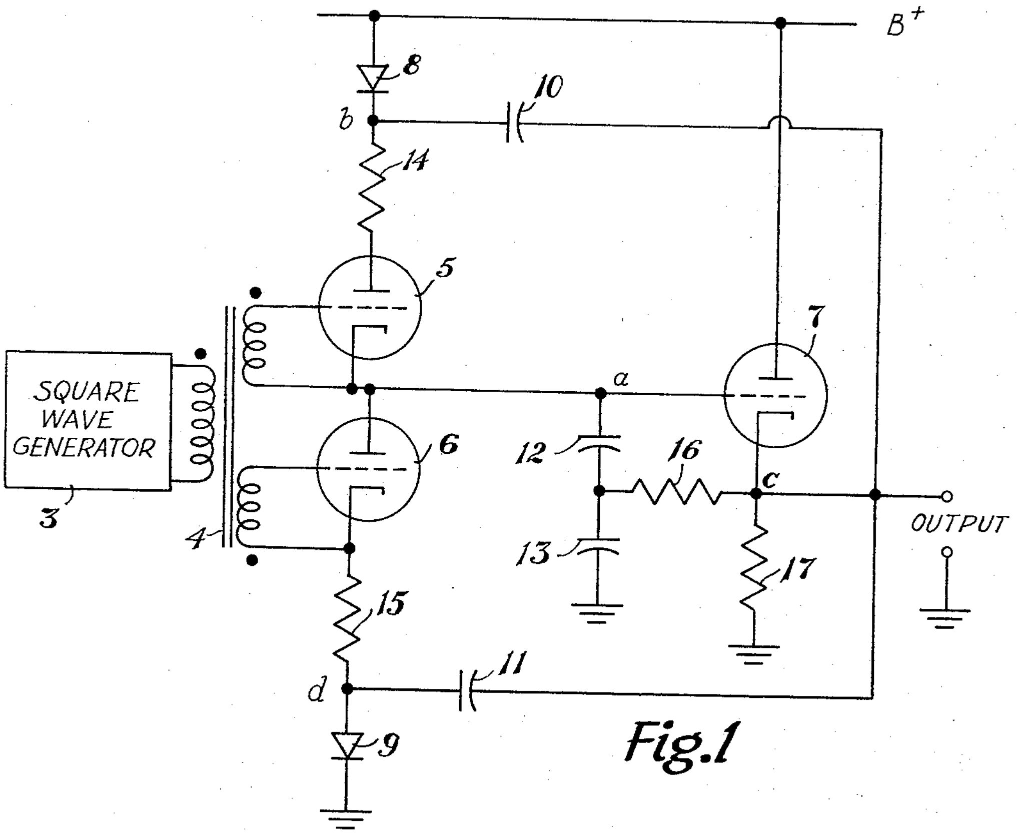
FIGURE 1 is a schematic diagram of a waveform generator embodying the principles of the invention.

In accordance with the principles of the invention, condensers 12 and 13 of FIGURE 1 are charged and discharged to generate a triangular voltage waveform. Although the present invention may be practiced with a single condenser, the use of the two condensers in combination with resistor 16 as shown is preferred. If the resistor 16 is of the proper value such an arrangement constitutes a compensating network which results in further sweep linearity in addition to that provided by the invention. Compensating networks of this type are disclosed in detail in the MIT Radiation Laboratories Series, published by McGraw Hill 1949, volume 19, chapter 7, section 7–9. Condensers 12 and 13 are coupled to the grid of triode 7 as shown. Triode 7, which may be a 6BK4, NU131, 7235 or other suitable tube, is connected as a cathode follower between the B+ plate supply voltage source and ground. The condensers 12 and 13 are charged initially from the plate supply voltage source or other suitable voltage source through diode 8, resistor 15 and diode 9 until the respective diodes are cut off due to feedback. Thereafter the diodes no longer function in the changing circuit. Any tube suitable for switching purposes such as a 6BK4, NU131 or the like may be used for triodes 5 and 6. The output of square wave generator 3 is coupled to the grids of triodes 5 and 6 by means of transformer 4. The polarities of the transformer secondaries are arranged as shown such that triodes 5 and 6 are alternately biased off and on. This switching arrangement is of course merely illustrative of a convenient means for alternately charging and discharging condensers 12 and 13 and any other method of accomplishing the desired switching would be equally applicable to the invention. Finally, feedback circuits are connected between the output of the cathode follower and the charge and discharge circuits. Each of these feedback circuits includes a substantially constant voltage source such as large condensers, 10 and 11. The capacitance of condensers 10 and 11 should be an order of magnitude larger than the combined capacitance of condensers 12 and 13 to effectively provide substantially constant voltage sources. Alternatively, condensers 10 and 11 may be replaced by suitable batteries, zener diodes, or glow discharge tubes.

Figure 2:
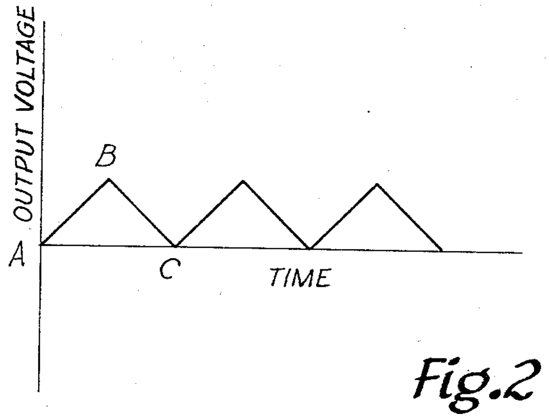
FIGURE 2 illustrates a voltage waveform of the type generated by the waveform generator of FIGURE 1.

Having reference now to both FIGURES 1 and 2, operation of the circuit above described is as follows: Condenser 10 is initially charged from the plate supply through the circuit including diode 8 and resistor 17 to ground. At a time represented by point A of FIGURE 2, the output of square wave generator 3 biases triode 5 to conduction and triode 6 off thereby permitting condenser 10 to discharge through resistor 14, triode 5 and into condensers 12 and 13. The charging voltage at point *a* on condensers 12 and 13 goes through triode 7. This effectively raises the voltage at point *c* through the cathode follower, and at point *b* through condenser 10. By raising the voltage is meant that the voltage is going positive. Point *b* therefore goes above the B+ plate supply voltage cutting off diode 8 and maintaining a constant voltage across resistor 14 and triode 5. The positive sweep is thus linearized as indicated by line AB of FIGURE 2.

During the positive sweep, condenser 11 is being charged through diode 9. At the time represented by point B of FIGURE 2, the output of square wave generator 3 biases triode 5 off and triode 6 on. This has the effect of initially discharging condensers 12 and 13 through triode 6, respectively 15 and diode 9 to ground. The voltage at point *a* then goes negative making the voltage at point *c* negative. The voltage at point *d* also goes negative through condenser 11. Condenser 11 builds up additional charge during this period. As point *d* goes negative, it cuts off diode 9 and maintains a constant voltage across triode 6 and resistor 15. This has the effect of linearizing the negative sweep as indicated by line BC of FIGURE 2.

Figure 3:
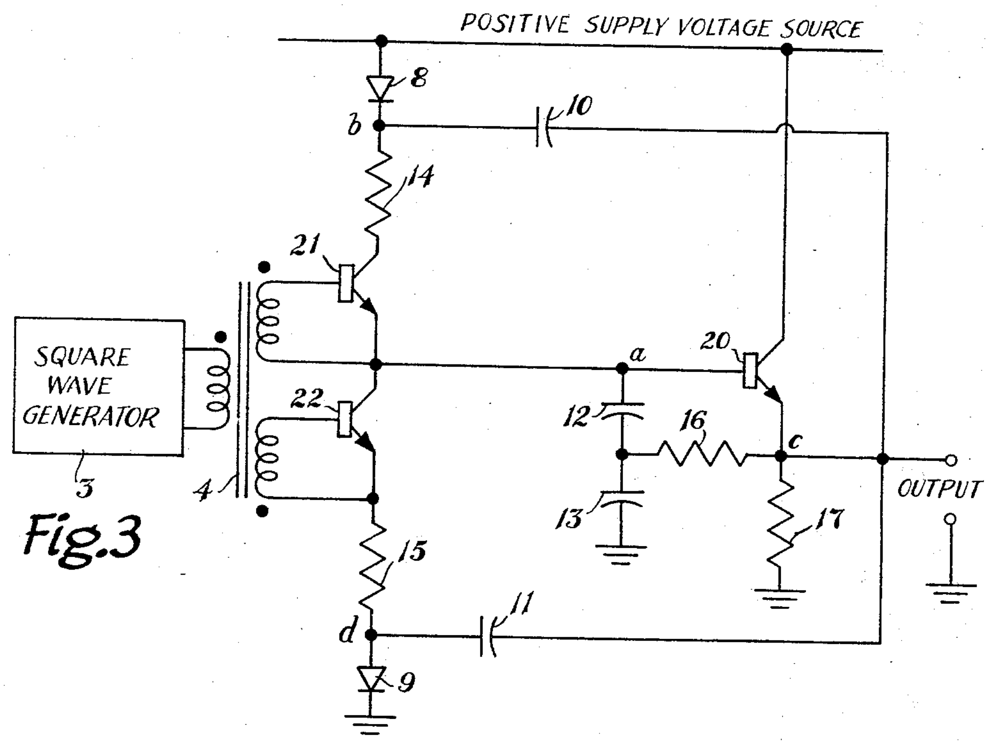
FIGURE 3 is a schematic diagram of a transistorized voltage waveform generator of the type comprehended by the invention.
Figure 4:
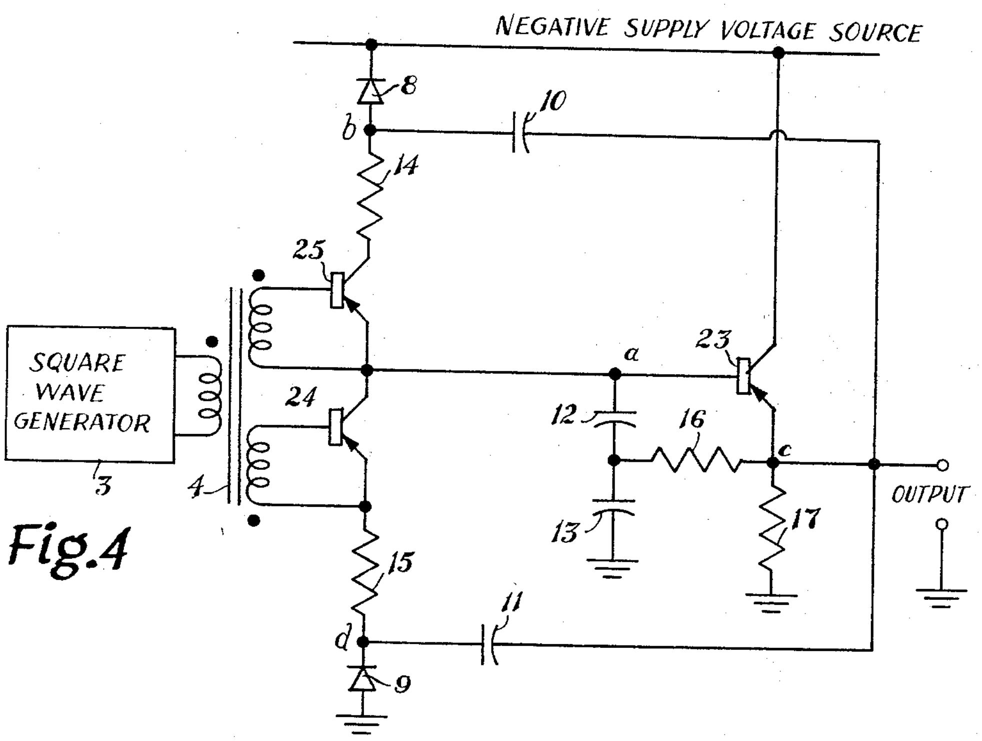
FIGURE 4 is a modified version of the schematic diagram of FIGURE 3.

Referring now to FIGURES 3 and 4 there are illustrated thereby transistorized versions of the waveform generator of FIGURE 1. The apparatus of FIGURE 3 is operated from a positive supply voltage source and NPN type transistors 20, 21 and 22 replace triodes 7, 5 and 6 respectively of FIGURE 1. The apparatus of FIGURE 4 is operated from a negative supply voltage source and PNP type transistors 23, 24 and 25 are employed in lieu of triodes 7, 5 and 6 respectively of FIGURE 1.

While the invention has been described in its preferred embodiments, it is understood that the words which have been used are words of description rather than of limitation and that changes within the purview of the appended claims may be made without departing from the true scope and spirit of the invention in its broader aspects.

What is claimed is:

1. A triangular waveform generator comprising an electron tube having an anode, a cathode and a control grid connected as a cathode follower, capacitor means effective to control the output of said cathode follower connected between said control grid and ground, a plate supply voltage source, a first circuit means for charging said capacitor means including a first diode connected to said plate supply voltage source, and a first switching means for interrupting the charging current serially connected between said first diode and said control grid, a second circuit means for discharging of said capacitor means including a second diode connected to ground and a second switching means for interrupting the discharge current serially connected between said second diode and said control grid, a first feedback circuit including a first substantially constant voltage source connected between the output of said cathode follower and the junction of said first diode and said first switching means for interrupting the capacitor charging current, a second feedback circuit including a second substantially constant voltage source connected between the output of said cathode follower and the junction of said second diode and said second switching means for interrupting the capacitor discharge current, and means for alternately activating the first switching means for interrupting the capacitor charging current and the second switching means for interrupting the capacitor discharge current to alternately charge and discharge said capacitor.

2. A triangular waveform generator comprising a triode connected as a cathode follower, capacitor means effective to control the output thereof connected to the control grid of said triode, a plate supply voltage source, a first diode connected to said plate supply voltage source to pass current therefrom, a first resistor connected to said first diode, first and second electron tubes, each said tube having an anode, a cathode and a control grid, said first electron tube having its anode connected to said first resistor and its cathode connected to the anode of said second electron tube and to the control grid of said cathode follower, a second resistor connected to the cathode of said second electron tube, a second diode connected between said second resistor and ground to pass current thereto, a first feedback circuit including a substantially constant voltage source connected between the output of said cathode follower and the junction of said first resistor and said first diode, a second feedback circuit including a substantially constant voltage source connected between the output of said cathode follower and the junction of said second resistor and said second diode, a square wave generator, and means for coupling the output of said square wave generator to the grids of said first and second electron tubes to alternately bias said first and second electron tubes on and off.

3. A triangular waveform generator comprising an NPN transistor connected as an emitter follower, capacitor means effective to control the output thereof connected to the base of said transistor, a positive supply voltage source, a first diode connected to said positive supply voltage source to pass current therefrom, a first resistor connected to said first diode, first and second NPN transistors, said first NPN transistor having its collector connected to said first resistor and its emitter connected to the collector of said second NPN transistor and to the base of the emitter follower transistor, a second resistor connected to the emitter of said second NPN transistor, a second diode connected between said second resistor and ground to pass current thereto, a first feedback circuit including a substantially constant voltage source connected between the output of said emitter follower and the junction of said second resistor and said second diode, a square wave generator, and means for coupling the output of said bases of said first and second NPN transistors.

4. A triangular waveform generator comprising a PNP transistor connected as an emitter follower, capacitor means effective to control the output thereof connected to the base of said transistor, a negative supply voltage source, a first diode connected to said negative supply voltage source to pass current therefrom, a first resistor connected to said first diode, first and second PNP transistors said first PNP transistor having its collector connected to said first resistor and its emitter connected to the collector of said second PNP transistor and to the base of the cathode follower transistor, a second resistor connected to the emitter of said second PNP transistor, a second diode connected between said second resistor and ground to pass current thereto, a first feedback circuit including a substantially constant voltage source connected between the output of said cathode follower and the junction of said first resistor and said first diode, a second feedback circuit including a substantially constant voltage source connected between the output of said cathode follower and the junction of said second resistor and said second diode, a square wave generator, and means for coupling the output of said square wave generator to the bases of said first and second PNP transistors.

References Cited

UNITED STATES PATENTS

| | | | |
|---|---|---|---|
| 2,602,151 | 7/1952 | Carbrey | 328—127 |
| 2,688,075 | 8/1959 | Palmer | 382—182 X |
| 2,983,831 | 5/1961 | Walton | 328—182 X |
| 2,998,532 | 8/1961 | Smeltzer | 328—184 X |

OTHER REFERENCES

Electronic and Radio Engineering, by Terman (1955), McGraw-Hill Book Co., pages 650–651, Fig. 18.39.

Waveforms, by Chance et al., Radiation Lab. Series (1948), McGraw-Hill Book Co., Inc, pages 274–275, Fig. 7.22.

ARTHUR GAUSS, *Primary Examiner.*

J. S. HEYMAN, *Assistant Examiner.*